United States Patent [19]

Rines et al.

[11] 4,351,269

[45] Sep. 28, 1982

[54] METHOD OF AND APPARATUS FOR UNCONFINED FISH FARMING AND THE LIKE

[76] Inventors: Robert H. Rines; Albert H. Knowles, both of 13 Spaulding St., Concord, N.H. 03301

[21] Appl. No.: 181,832

[22] Filed: Aug. 27, 1980

[51] Int. Cl.$^3$ ............................................. A01K 61/00
[52] U.S. Cl. .......................................................... 119/3
[58] Field of Search ...................... 119/3, 5; 43/4.5, 7

[56] References Cited

U.S. PATENT DOCUMENTS

| | | | |
|---|---|---|---|
| 2,874,505 | 2/1959 | Cobile | 43/7 |
| 3,320,928 | 5/1967 | Smith | 119/3 |
| 3,643,632 | 2/1972 | Poirot | 119/54 |
| 3,698,359 | 10/1972 | Fremont | 119/3 |
| 3,730,142 | 5/1973 | Kahrs et al. | 119/54 |
| 4,271,788 | 6/1981 | Knowles | 119/3 |

FOREIGN PATENT DOCUMENTS 1762 of 1901 United Kingdom .................... 119/3

Primary Examiner—Hugh R. Chamblee
Attorney, Agent, or Firm—Rines and Rines, Shapiro and Shapiro

[57] ABSTRACT

The invention is concerned with training fish, such as salmonoids and other varieties exhibiting similar growth habits and characteristics, to live and feed in concentrated vertical stacks under light-blocking covers contacting the water (floating upon or submerged, partly or totally), such that the fish need not be contained by nets, walls or other barriers in the sea or other water bodies; and then may be harvested or otherwise collected or even transported, when desired, by enclosing or sweeping the dark areas under the covers by nets or cages or the like, or transporting the covers, with the fish moving to stay in the dark areas thereunder, to an enclosed, netted or otherwise barriered area.

14 Claims, 4 Drawing Figures

METHOD OF AND APPARATUS FOR UNCONFINED FISH FARMING AND THE LIKE

The present invention relates to methods of and apparatus for fish-farming, being more particularly, though not exclusively, directed to the growing of fish such as salmonoids and the like in large water bodies, including the sea, with simplified apparatus and procedures.

Underlying part of the invention is the phenomenon reported in U.S. Pat. No. 4,271,788 of the applicants herein, "PROCESS AND APPARATUS FOR ACCELERATING GROWTH RATE OF SALMONOIDS AND OTHER FISH AND THE LIKE", that salmonoids (salmon parr in fresh water; smolt and maturing salmon in saltwater; trout, char, etc.) and shoal-type and related fish that exhibit similar growth habits and characteristics, have been found to seek the dark shadow areas under light-blocking covers floated upon or submerged below (partly or totally) the water surface of a pool, pond, cage or other water volume. By providing feed circulating in the volume, particularly in regions external to the covers and illuminated from above (preferably for continual periods up to 24 hours a day), it has been found that the fish remain continually in place under the cover, and accelerate their feeding and growth rate, also without agitation or feed competition or disfiguring, and can be trained to accept such cover living, as further described in the applicants' copending application Ser. No. 083,571 for Fish Growth Acceleration and Density-Increasing Apparatus and Method, now U.S. Pat. No. 4,287,852.

It has heretofore been thought that small salmon Fish Growth Acceleration and Density-Increasing Apparatus and Method, now U.S. Pat. No. 4,287,852.

It has heretofore been thought that small salmon and the like stay near the bottom and do not generally cruise over a substantial territory; and fry and parr ponds, therefore, have been relatively shallow—from a few to about eight inches water depths, more or less.

It has been now observed that, for much deeper water volumes (say three feet or more in fresh-water salmon parr ponds, for example), the fish tend vertically to stack in rather dense fashion and to stay in general stack position, circulating as a mass with or against water current, depending upon maturity. In such deeper volumes, the habit of staying (or circulating) in position under the cover, is remarkably consistent, with the fish darting out of the dark area on an individual basis to obtain feed in the surrounding or external illuminated region at will, and then promptly returning substantially to their original place under the cover—the now normal "permanent" living area.

Because of this phenomenon, not only is increased growth accelerated over growth in normal ponds, pools, cages, etc., as discussed in said applications (about 100% weight increase over the first 12 months in normal environmental water in Northern Scotland for salmon fry and parr), but, once acclimated or trained to live under the cover (within a few days for salmon parr), the fish do not forget the habit of cover living, even if removed to an open pond for a substantial period of time before being returned to the cover system again. For example, salmon parr raised under the cover system for about five months and then removed to a much larger uncovered pond for three-to-four months, rapidly resumed the previous under-cover living habit within a half an hour or so following return to the cover system.

In accordance with the present invention, use is made of this acclimating or training phenomenon, immeasurably to simplify and reduce the cost of fresh-water and sea cage and similar large water body fish farming; it being accordingly an object of the invention to provide a new and improved method of and apparatus for substantially (or relatively) unconfined fish farming that can obviate the need for conventional cage or other enclosing constructions and operational complexities and cost.

A further object is to provide a novel fish-growing and harvesting method and apparatus of more general utility as well.

Other and further objects will be explained hereinafter and are more particularly delineated in the appended claims.

In summary, from one of its important aspects, the invention embraces a method of fish farming, that comprises, training fish to stack in the dark areas under water-contacting light-blocking covers and under lateral confinement; disposing the fish under such covers without lateral confinement; and supplying feed in illuminated regions external to the dark areas under the covers. Preferred embodiments and best mode details are hereinafter presented.

The invention will now be described with reference to the accompanying drawings, FIG. 1 of which illustrates a preferred embodiment operating in accordance with the method underlying the invention;

Figure 1:
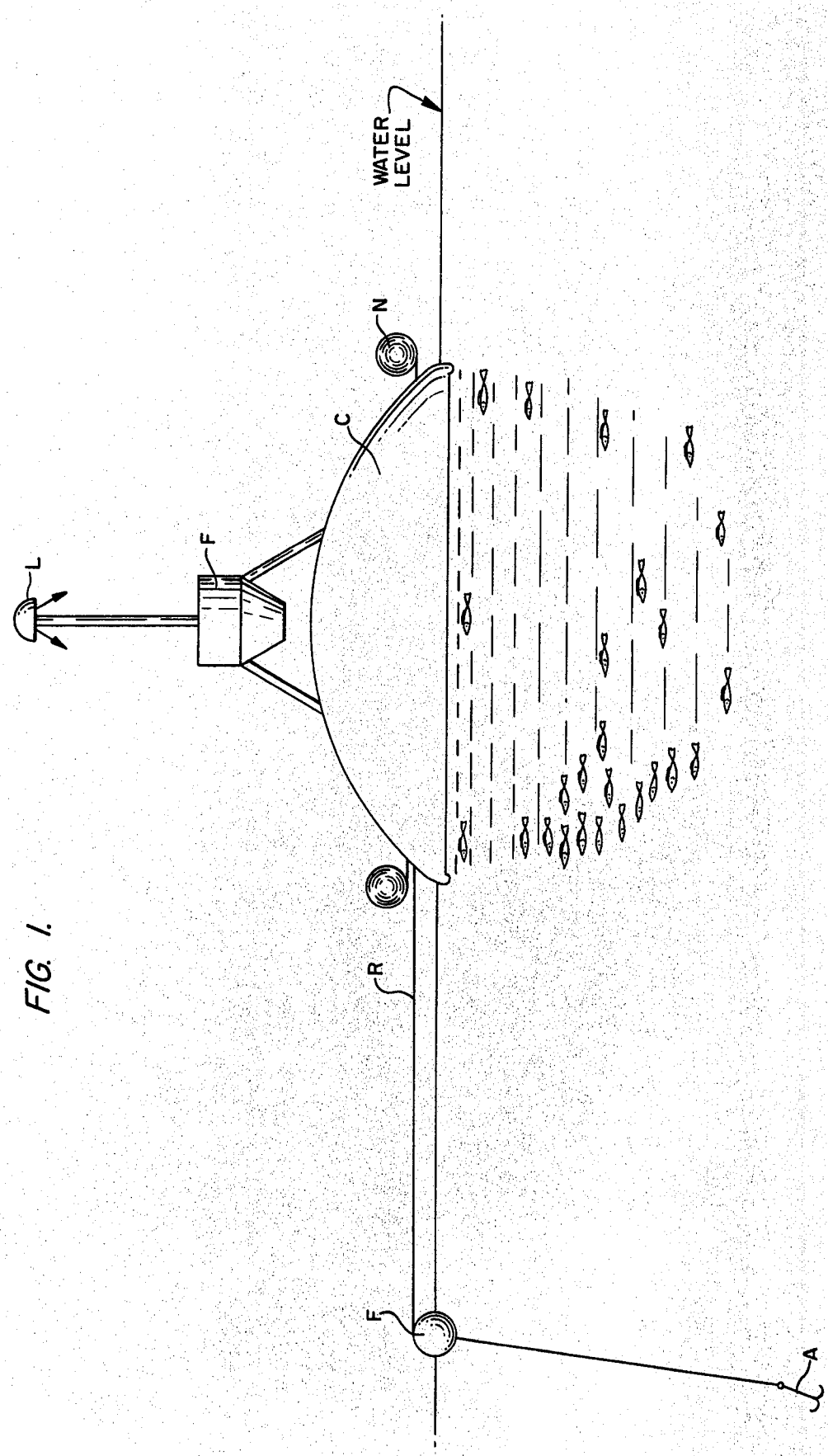
Figure 2:
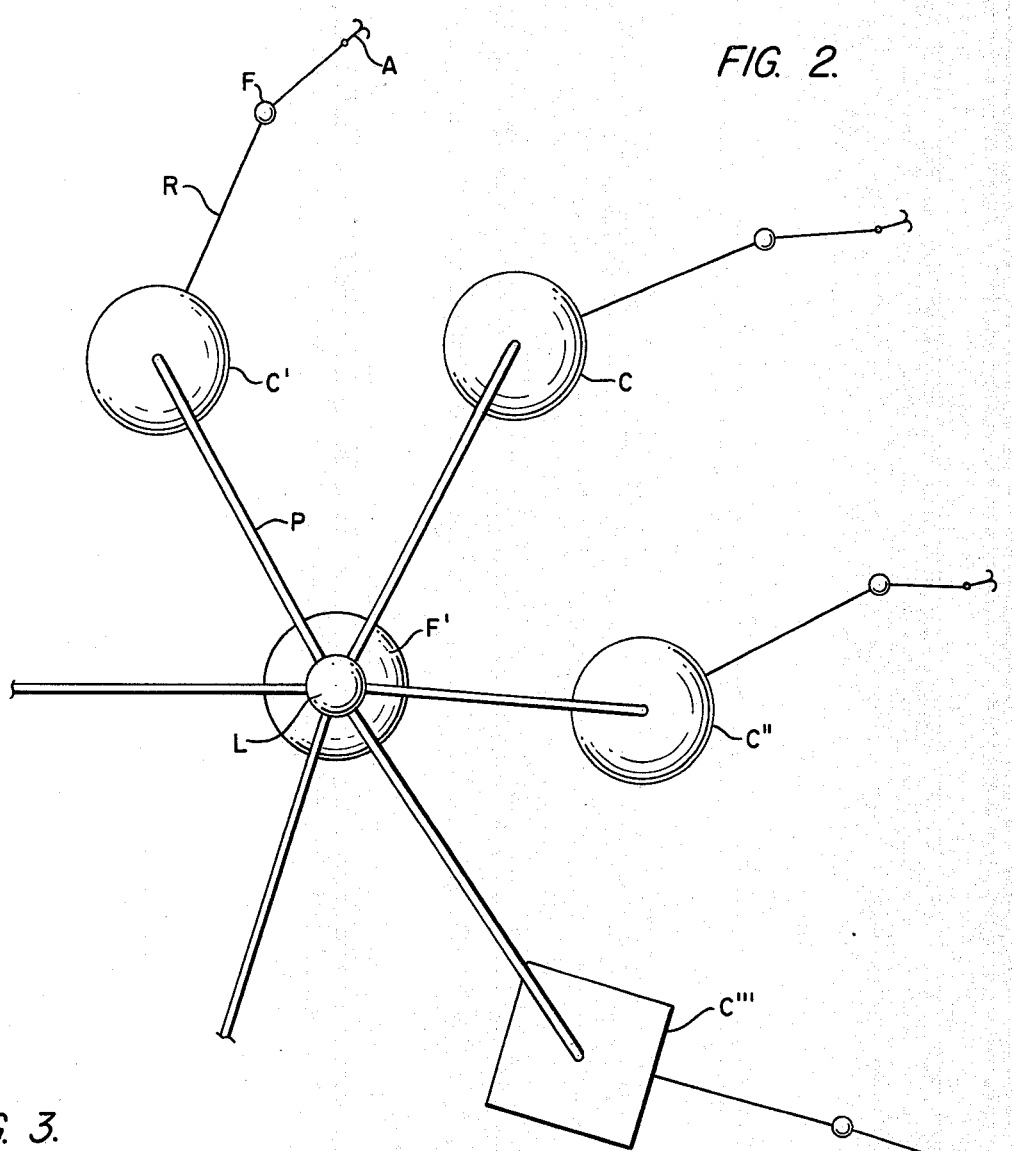
FIG. 2 is a modification for multi-cover systems.

Floating light-blocking covers (as of opaque material such as fiberglass, for example) are shown in FIG. 2 at C, C', C'', etc. in circular form, and at C''' in square or rectangular contour, with the circular cover further detailed in FIG. 1, and positionable at any desired location in the sea (or a lake or river) or any desired predetermined water surface area, as by tie-up ropes R to mooring floats F and anchors A. If fish (such as the illustrative salmon smolt) have been earlier trained to live in the dark areas under such covers in the stacked array shown in FIG. 1, as in confined pools, and are then transferred to the relatively unconfined sea or other locations, with a bottom weighted net N preferably initially rolled down for a brief period to insure confining during acclimation (but the net may be open at the bottom in view of the above-described stacking-in-place phenomenon), the under-cover living habit may be simply maintained. The feed may be tumbled downwardly over the convex cover surfaces from the feed supply, such as a solenoid or water-wave-operated shutter feeder F, attached to the cover as in FIG. 1, or feed supplied through pipes P to the top of the covers from a central tide-operated feeding cylinder $F^1$, FIG. 2, including, for example, a tide-operated feeder more fully detailed in connection with FIG. 3. The tumbling feed falling off the cover edges will be observed by the fish under the covers, in the peripherally illuminated regions about the covers, inducing and maintaining the growth phenomenon before described. Continual battery or remote power illumination of the peripheral feed regions may be provided at L, FIG. 1. This may, if desired, be coupled with light, vibration, sound or similar distinct and recognizable signalling at feed time, as by a deliberate noise generated by the periodic shutter operation of the feeder F, during the training and/or final growing phase.

The net N, FIG. 1, may then be rolled up or otherwise withdrawn, laterally unconfining the stacked fish, and the fish will continue to stay in the dark volume under the cover, circulating with water movement, and feeding as previously described, at will, and returning to general position in the stack under the cover—all without other retention or confinement. Parr from 5 to 10 cm in length so living under cover, for example, in a dense population of the order of 4½ pounds of fish per cubic foot of water, have been observed to return to within 1 cm of original stack position after momentarily darting out for food. From observation, little if any loss or straying permanently away from cover position will occur; and if a plurality of covers is maintained (perhaps even in an overall barriered area employing nets or energy fields, such as electric or sound or other energy "fields", that could aid in keeping out preditors), straying fish will take new positions under adjacent covers.

In further illustration of the remarkable manner in which salmon smolt, for example, can be trained or conditioned to complete acceptance of this under-cover stack position living, removing the fish so-acclimated to a water volume in which the water was circulated in the opposite direction, necessitated several days of re-orientation for a large proportion of the fish and over a week for the remainder to become fully retained for the new condition.

Figure 3:
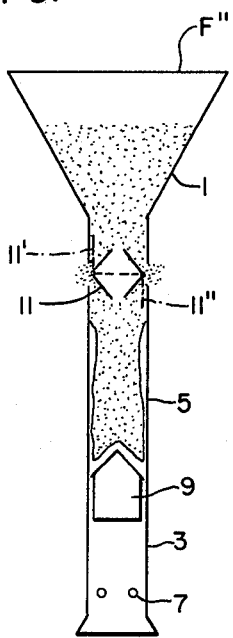
FIG. 3 is a section on an enlarged scale of a tide-operated or water-level-operated feeder for use in the system of FIG. 2.

Referring to FIG. 3, a common feeder F" operated automatically by the change in water level, as effected by the tides, is shown provided with a storage hopper 1 mounted in a hollow pipe column 3 that is secured to the bottom. A resilient water-proof bag 5 as of rubber or the like is secured to the inner wall of the column 3 at the top of the bag so that the feed will be resiliently held by the bag. Tide flow control vents 7 cause the rising and falling water levels to lift and lower the inner float 9, respectively, forcing and deforming the resilient bag upwardly and releasing it downwardly to cause hinged food control doors 11 to assume the left-hand dotted position 11', ejecting feed on the rising tide, and later the right-hand dotted position 11", ejecting feed on the falling tide. This can be extremely convenient for long periods of unattended operation.

The invention also enables free access to natural food in the sea near the covers (zoo-plankton, shrimp, small fish shoals, etc.), supplementing the provided feed F—with the fish returning to cover living after a brief foray for natural proximal food.

Figure 4:
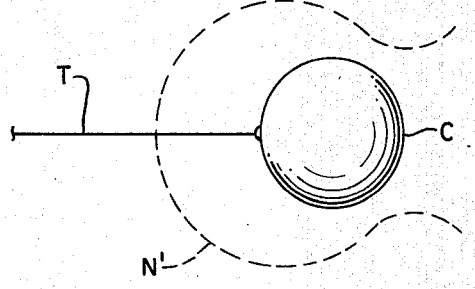
FIG. 4 is a plan view of transporting and enclosing steps.

When harvesting or collecting is desired, or moving to another location, the net N may be lowered, or a net otherwise applied about the cover; or, as shown in FIG. 4, the cover may be towed at T into a trap-net N', with the fish moving with and under the towed cover.

The simplicity of operation and cost compared to present-day salmon and other sea cage operations and void of problems such as net-choking by mussels and weed, ice storm and other environmental damage, etc., and frequent attendance at the cages, is immediately apparent; and further modifications will occur to those skilled in this art—such being considered to fall within the spirit and scope of the invention as defined in the appended claims.

What is claimed is:

1. In a method of fish farming, the steps including confining fish under a water-contacting light-blocking cover disposed in a body of water, by providing lateral confinement means extending around and downwardly of the cover, moving the cover and confinement means through the water so as to transfer the fish from one location to another, then removing the confinement means and supplying feed to the fish externally of the cover during continued growth of the fish.

2. A method as claimed in claim 1, wherein the confinement means is netting which can be raised and lowered through the water around the cover.

3. A method of fish farming which comprises providing a confined body of water having water-contacting light-blocking cover means which defines a dark area thereunder for fish to stack, and lateral confinement means for the fish surrounding the cover means, allowing the fish to live in the confined body of water for a predetermined period of time while supplying feed to the fish external of the cover means, then providing a relatively unconfined body of water having water-contacting light-blocking cover means as aforesaid but lacking the confinement means, and causing the fish to continue living in the unconfined body of water while continuing to supply feed to the fish in a region of the unconfined body of water external to the cover means.

4. A method as claimed in claim 3, wherein the confined body of water is a confined pool, and the unconfined body of water is the sea, a lake, or the like.

5. A method as claimed in claim 3, wherein the confinement means is disposed around the cover means and extends downwardly therefrom.

6. A method as claimed in claim 5, wherein the confinement means comprises netting.

7. A method as claimed in claim 6, wherein the netting is raised to provide the unconfined body of water.

8. A method as claimed in claim 6, wherein the cover means and netting is moved through the water to transfer the fish from one location to another and then the netting is raised.

9. A method as claimed in claim 4, wherein the cover means in the unconfined body of water comprises a plurality of individual covers distributed over a predetermined water surface area.

10. A method as claimed in claim 9 in which said area is at least partly surrounded by barriers and the like.

11. A method of fish farming which comprises causing fish to live in stacked undercover conditions in a body of water having lateral confinement means for the fish, while supplying feed to the fish in an uncovered region of the body of water, then, after a predetermined growing period, removing the lateral confinement means and allowing the fish to continue growing in relatively unconfined conditions while continuing to supply feed to the fish as aforesaid.

12. A method of fish farming which, during a fish growing period, comprising confining the fish in a body of water under a water contacting light blocking cover means by providing lateral confinement means around the cover means, then removing the confinement means and supplying feed to the fish externally of the cover means during continued growth thereof.

13. A method as defined in claim 12, wherein prior to removal of the confinement means, the fish are transferred fron one location to another by moving the cover means and confinement means through the water.

14. A method as claimed in claim 13, wherein the confinement means is netting which can be raised and lowered through the water.

* * * * *